United States Patent
Rogers et al.

[15] 3,664,451
[45] May 23, 1972

[54] VEHICLE REAR WHEEL DRIVE ASSEMBLY

[72] Inventors: John A. Rogers; Fredrick R. Bossard, both of Fort Dodge, Iowa

[73] Assignee: Standard Engineering Co., Inc., Fort Dodge, Iowa

[22] Filed: Jan. 26, 1970

[21] Appl. No.: 5,740

[52] U.S. Cl. ............................................. 180/70 R, 115/1 R
[51] Int. Cl. ..................................................... B60k 17/28
[58] Field of Search .................. 115/1; 280/111; 180/70, 14, 180/51, 11

[56] References Cited

UNITED STATES PATENTS

| | | | |
|---|---|---|---|
| 3,183,991 | 5/1965 | Gamaunt | 280/111 |
| 2,400,132 | 5/1946 | Porter | 115/1 |
| 1,759,280 | 5/1930 | Romaniuk | 115/1 |
| 2,397,791 | 4/1946 | Kramer et al. | 115/1 |
| 3,323,608 | 6/1967 | Eggert | 115/1 X |
| 3,426,720 | 2/1969 | Enos | 280/111 X |

Primary Examiner—Kenneth H. Betts
Attorney—Zarley, McKee & Thomte

[57] ABSTRACT

A vehicle having front and rear body sections rotatably interconnected along the longitudinal axis of the body sections. An engine is located in the front body section and a drive shaft extends through the coupling between the body sections through the compartment of the rear body section and to a gear box on a rear axle located entirely outside of the compartment of the rear body section. The rear axle is supported by frame members extending rearwardly from the rear body section. A wall extends horizontally over the rear axle and provides a seat for the compartment in the rear body section. A propeller may be connected to a drive shaft extending rearwardly from the gear box on the rear axle.

3 Claims, 4 Drawing Figures

PATENTED MAY 23 1972   3,664,451
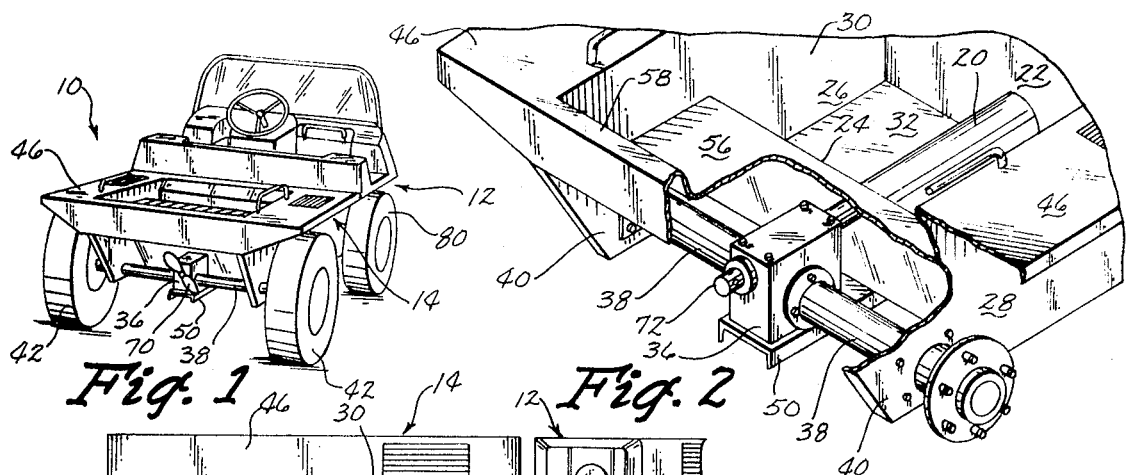
Fig. 1
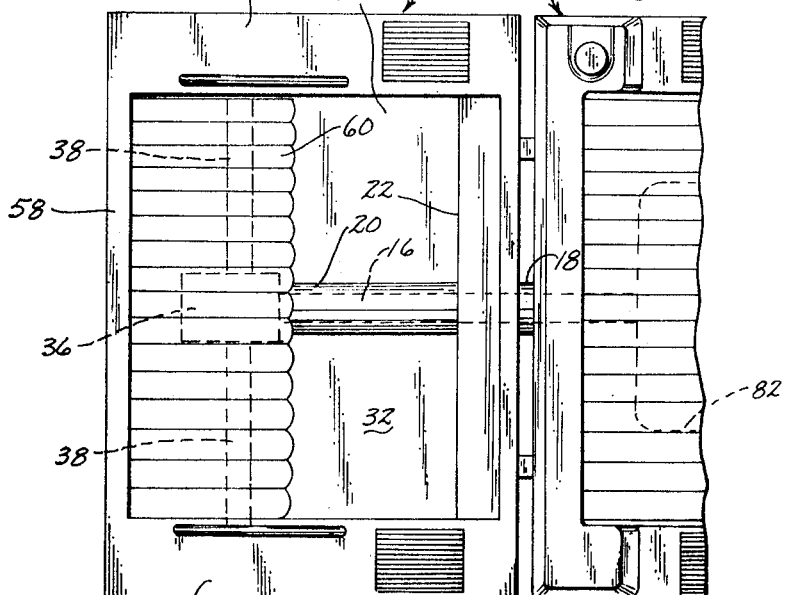
Fig. 2
Fig. 3
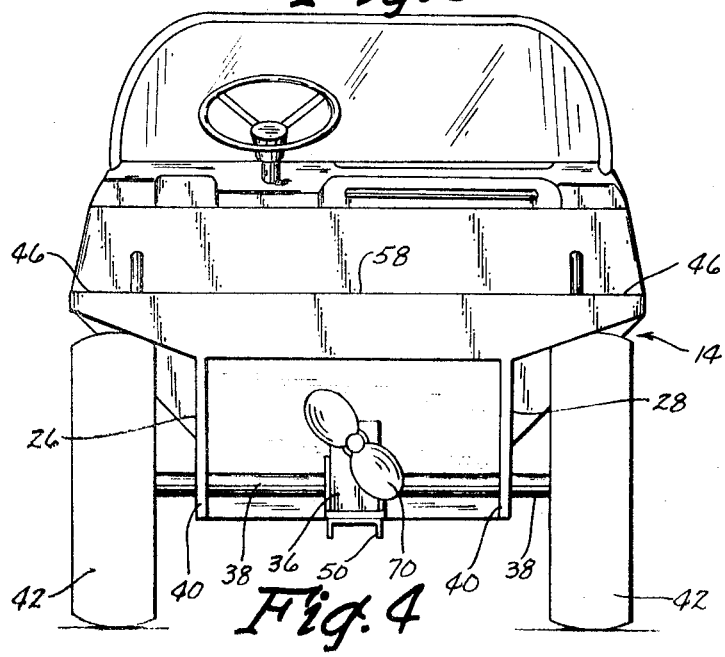
Fig. 4
INVENTORS
JOHN A. ROGERS
FREDRICK R. BOSSARD
BY
Zarley, McKee & Thomte
ATTORNEYS

VEHICLE REAR WHEEL DRIVE ASSEMBLY

The vehicle of this invention is designed to travel on all types of terrain and may be operated in water. Rough terrain or terrain with heavy underbrush will interfere with the axles of a conventional vehicle wherein the rear axle, for example, extends below the vehicle body. The vehicle of this invention includes a rear axle which does not extend below the body or through the body but rather extends along the back side of the body above the bottom horizontal plane thereof. Accordingly, the rear axle is free of becoming lodged against rocks or the like or entangled with heavy underbrush.

More specifically, the engine is located in the front body section and a drive shaft extends back through the rear wall of the front body section, through the front and rear walls of the rear body section into a gear box connected to the rear axle behind the rear body section. A pair of frame members extend rearwardly of the rear body section for supporting the rear axle. A drive shaft extends rearwardly of the gear box on the rear axle for driving a propeller when the vehicle is being operated in water. During water operation the propeller is also above the bottom of the vehicle and thus is protected against entanglement with obstructions on the bottom of the body of water. The compartment in the rear body section includes a wall extending horizontally over the rear axle and gear box which provides a seat in the rear compartment of the rear body section. The drive shaft connected to the gear box on the rear axle extends through a protective sleeve on the bottom wall of the compartment in the rear body section and thence through a sleeve type coupling connecting the front and rear body sections together. The forward end of the drive shaft is coupled in a conventional manner to an engine.

Additional support and strengthening is provided by inclusion of a channel member extending rearwardly along the bottom side of the rear body section to support the gear box.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of a vehicle having the rear wheel drive assembly of this invention.

FIG. 2 is a fragmentary perspective view of the vehicle showing the rear wheel drive assembly.

FIG. 3 is a fragmentary top plan view thereof; and

FIG. 4 is a rear end elevation view.

The all terrain type vehicle of this invention is referred to generally in FIG. 1 by the reference numeral 10 and includes a front body section 12 rotatably connected to a rear body section 14 about a longitudinal center axis as best seen in FIG. 3. The coupling between the front and rear body sections is more fully described in applicants' co-pending application, Ser. No. 886,473, filed Dec. 19, 1969.

A drive shaft 16 extends from the front body section through a body coupling 18 into a sleeve 20. The sleeve 20 extends between front and rear walls 22 and 24 cooperating with side walls 26 and 28 to define a compartment 30. A floor 32 is provided in the compartment 30. The drive shaft 16 then extends through the rear wall 24 where it is engaged by a gear box 36 connected to oppositely extending axle portions 38 which pass through rearwardly extending frame members 40 connected to the rear end of the body portion 14 to thereby support the axle portions 38. Powered drive wheels 42 are provided on the axle portions 38 and are partially covered on top by outwardly extending fender wall portions 46.

The gear box 36 is provided with additional support by a channel member 50 secured to the bottom wall 32 of the compartment 30. It is seen that the gear box 36 and the axle portions 38 are positioned above the bottom wall 32 of the compartment 30 and thus are protected against hitting protrusions on the ground such as rocks or becoming entangled in brush or the like. The axle portions 38 and the gear box 36 are completely disposed outside of the compartment 30 defined by the front and rear walls 22 and 24, the side walls 26 and 28 and the bottom wall 32.

A seat in the compartment 30 is provided by a wall portion 56 extending rearwardly from the vertical wall portion 24 over the gear box 36 and the axle portions 38. The seat wall portion 56 terminates in an upstanding back wall rest panel 58 interconnected at its ends by the compartment side walls 26. A cushion 60 may be provided on the seat wall 56 as seen in FIG. 3.

A propeller 70 may be provided for driving the vehicle in water by mounting it on a stub shaft 72 extending rearwardly out of the gear box 36 as seen in FIGS. 2 and 4. By virtue of the gear box location behind and above the compartment bottom wall 32 the propeller is protected against being damaged by obstructions on the terrain or in the water.

It is thus seen that the entire support for the rear axle portions 38, gear box 36 and wheels 42 is provided by the rearwardly extending frame members 40 and the center channel support member 50. The gear box, axle portions and wheels are completely exposed outside of the compartment 30 for easy assembly and maintenance. Moreover, persons within the rear body section compartment 30 are completely safe from becoming injured by the rear axle, gear box and propeller drive shaft due to the outside location of this power train. Although the rear axle power train is fully exposed it nevertheless is fully protected from being damaged while the vehicle is in operation either on rough land or in water by its location above and behind the bottom wall of the rear body section compartment.

Applicants have disclosed in a co-pending application, Ser. No. 886,472, filed Dec. 19, 1969, the front wheel drive assembly for providing power to the front wheels 80 from an engine 82 located in the front body section 12.

We claim:

1. A vehicle having front and rear body sections rotatably interconnected about the longitudinal axis of each of said front and rear body sections,
   a power means in one of said body sections,
   a drive shaft connected to said power means and extending rearwardly from said rear body section into operative engagement with a transversely extending rear axle for driving rear wheels on opposite ends of said rear axle, and
   said rear axle being located entirely outside of the confines of said rear body section,
   said drive shaft and said rear axle being interconnected by a gear box, said gear box being located entirely outside the confines of said rear body section,
   said rear axle being positioned in a horizontal plane at least substantially above the bottom horizontal plane of said rear section,
   oppositely disposed side support members extending rearwardly of said rear body section, said rear axle extending through said side support members whereby said rear axle is supported by said side support members,
   said gear box being supported on a support member extending rearwardly from the underside of said rear body section.

2. A vehicle having front and rear body sections rotatably interconnected about the longitudinal axis of each of said front and rear body sections,
   a power means in one of said body sections,
   a drive shaft connected to said power means and extending rearwardly from said rear body section into operative engagement with a transversely extending rear axle for driving rear wheels on opposite ends of said rear axle, and
   said rear axle being located entirely outside of the confines of said rear body section,
   said drive shaft and said rear axle being interconnected by a gear box, said gear box being located entirely outside the confines of said rear body section,
   said rear axle being positioned in a horizontal plane at least substantially above the bottom horizontal plane of said rear section,
   and oppositely disposed side support members extending rearwardly of said rear body section, said rear axle extending through said side support members whereby said rear axle is rigidly supported against relative vertical movement by said side support members.

3. The structure of claim 2 wherein said rear body section includes rear and front vertical walls, opposite side walls and a bottom wall which cooperate to define a passenger compartment, said rear vertical wall is closely adjacent said gear box and said rear axle, a horizontal wall extends from said rear vertical wall rearwardly over said rear axle and said gear box to provide a seat for said passenger compartment.

* * * * *